June 9, 1942.  J. RUCHSER  2,285,615
INVERTIBLE SPECTACLE FRAME
Filed Nov. 26, 1940
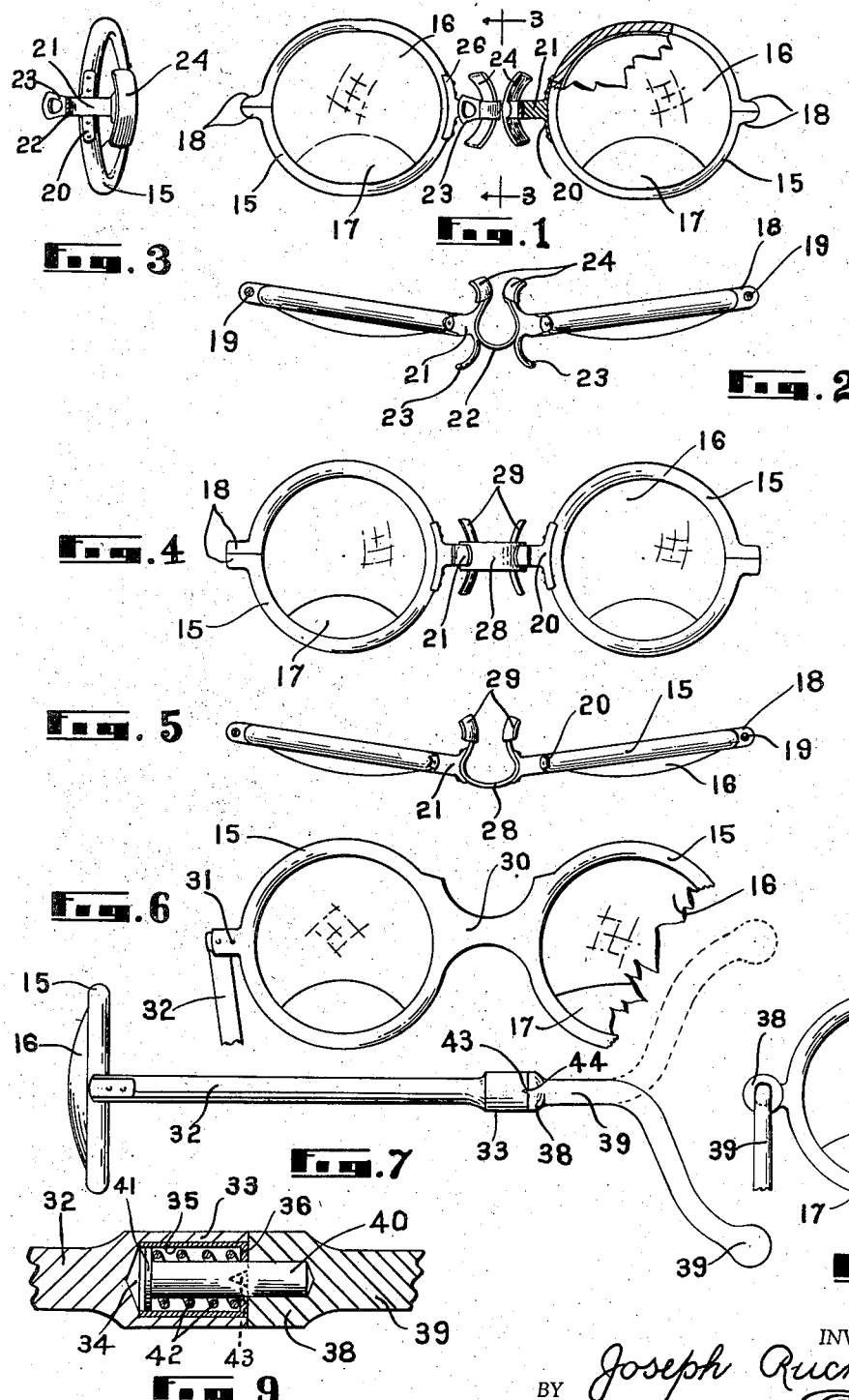

Patented June 9, 1942

2,285,615

UNITED STATES PATENT OFFICE 2,285,615

INVERTIBLE SPECTACLE FRAME

Joseph Ruchser, New York, N. Y.

Application November 26, 1940, Serial No. 367,260

1 Claim. (Cl. 88—41)

This invention relates to improvements in the most common of optical devices, known as spectacles and eye glasses, and more particularly to such as are provided with lenses for ordinary use and containing bi-focal inserts adapted for far sight.

The ordinary type of such spectacles, while valuable for most purposes, have the serious disadvantage of being deceptive when the eyes are directed downwardly, as walking down stairs, due to the fact that the bi-focal inserts are almost invariably in the lower portion of the main lenses.

Having this matter in mind, it is an object of this invention to provide spectacles which may be easily and rapidly inverted, that is, turned upside down, in a manner to bring the inserts from the upper to the lower part of the main lenses, or opposite the position normally occupied.

A further feature is in the provision of a frame suited to engage on the bridge of the nose in either position of the spectacles with equal facility and comfort.

Another purpose is to produce spectacle bows having ear engaging hook-like end elements capable of being rotatably adjusted relative to the hinged bows to retain the lenses in either of two positions.

These advantageous objects are accomplished by the novel construction and combination of parts hereinafter described and illustrated in the accompanying drawing, constituting a component of this disclosure, and in which Figure 1 is a front elevational view of an embodiment of the invention, parts being in section to show the construction.

Figure 2 is a top plan view of the same.

Figure 3 is an end and sectional view thereof, taken on line 3—3 of Figure 1.

Figure 4 is a front view of a pair of nose glasses showing a modification thereof.

Figure 5 is a top plan view of the parts seen in Figure 4.

Figure 6 is a partial front view of another modified form of the invention.

Figure 7 is an end view thereof showing the reversible joint in the bows.

Figure 8 is a fragmentary rear elevational view thereof.

Figure 9 is an enlarged longitudinal sectional view of the jointed bow.

Referring in detail to Figures 1 to 3 of the drawing, the numeral 15 designates in general a conventional type of lens rim frame made in right and left hand, carrying lenses 16 in which are set bi-focal inserts 17.

Such frames are commonly provided at their outer edge portions with pairs of lugs 18 held by screws 19 to clamp the lenses in the frames.

Secured to the adjacent sides of the frames are clips 20 from which extend stems 21 connected by a U shaped bow spring 22 and provided with finger catches 23 by which the spring may be flexed to release arcuately curved grips 24, adapted to clasp the bridge of the nose, either side up, thus rendering the frames and lenses carried by them readily invertible.

In figures 4 and 5 the stems 21 are directly connected by a bow spring 28, its ends provided with cushion elements 29 so shaped as to fit the nose irrespective of the position of the lens frames.

Figures 6 to 9 show similar frames 15 carrying main lenses 16 and bi-focals 17; in this case the frames are rigidly connected by a bridge 30 of such shape and proportions as to rest comfortably and securely on the nose when the lenses are in normal or in an inverted position.

Lugs 31, extending from the outer edges of the frames 15, have pivotally secured in them bows composed of straight elements 32 to extend along the side of the face and terminate in enlarged sheaths 33, having bores 34 in which are fixed cylinders 35 having outer closures 36.

Juxtaposed against the sheaths 33 are the hubs 38 of curved hook shaped bow terminals 39 suited to rest over the ear in the usual manner.

Fixed in the hubs 38 are studs 40 slidable through the closures 36 and having heads 41 fitting within the cylinders 35 normally pressed inwardly by compression springs 42 coiled around the studs.

The sheaths 33 have in their outer ends sharp, but shallow, V shaped recesses 43 on two opposite sides, these recesses being receptive of correspondingly shaped spurs 44 on the ends of the hubs 38.

By this arrangement the bow extensions 39 may be drawn outwardly to permit disengagement of the spurs, turned half way around and then reengaged in the opposite recesses, thus enabling the spectacles to be used in either normal or reversed position at will.

Having thus described the invention and set forth the manner of its construction and operation, what is claimed as new and sought to secure by Letters Patent, is:

In spectacles having a pair of circular frames each carrying main lens and bifocal lens set therein, said frames being spring connected centrally of their axes by means of a bridge, opposed convex nose rests associated with said bridge, short straight bow elements hinged to said frames directly opposite said bridge connections, said bow elements having cylindrical enlargements at their free outer ends containing bored recesses and notches in their outer end edges, inverted reenforcing cups fixed in the recesses, hook-like extensions for said bow elements having enlarged hubs, studs fixed in said hubs to move through openings in the closed outer ends of said cups, heads on said studs movable in said cups, compression springs encircling said studs within the cups to press said heads inwardly, and projections on said hubs engageable selectively in the notches of said bow recesses.

JOSEPH RUCHSER.